Jan. 12, 1932.   M. GARBELL   1,841,107
TYPEWRITING MACHINE
Filed Jan. 10, 1928   11 Sheets-Sheet 1

INVENTOR:
Max Garbell
BY
Jones, Addington, Ames & Seibold
ATTORNEYS.

Jan. 12, 1932.  M. GARBELL  1,841,107
TYPEWRITING MACHINE
Filed Jan. 10, 1928  11 Sheets-Sheet 3
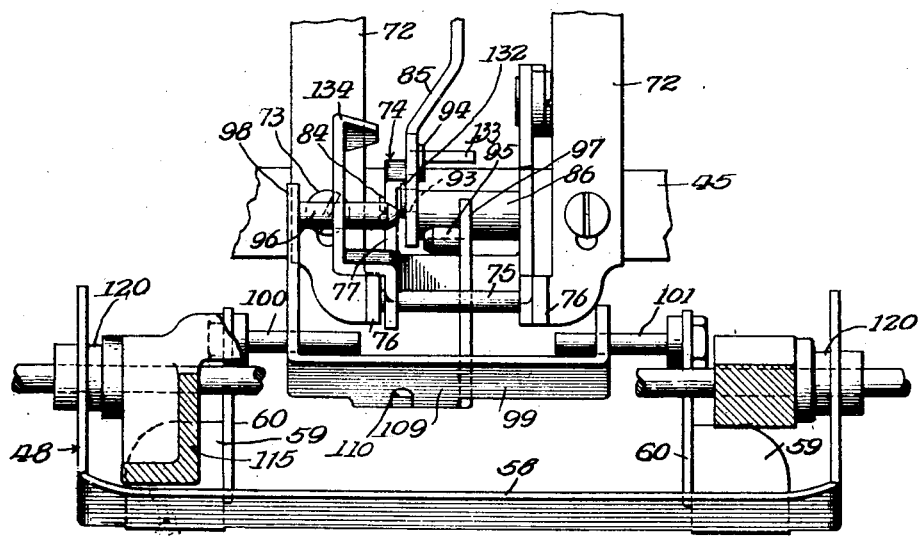
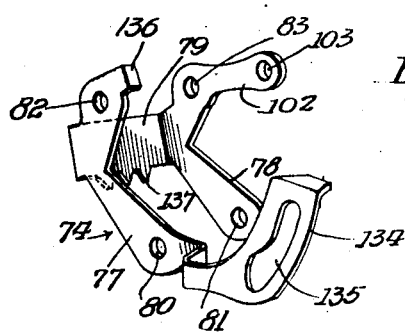
Inventor:
Max Garbell
By Jones, Addington, Ames + Seibold
Attys Jan. 12, 1932. M. GARBELL 1,841,107
TYPEWRITING MACHINE
Filed Jan. 10, 1928 11 Sheets-Sheet 4
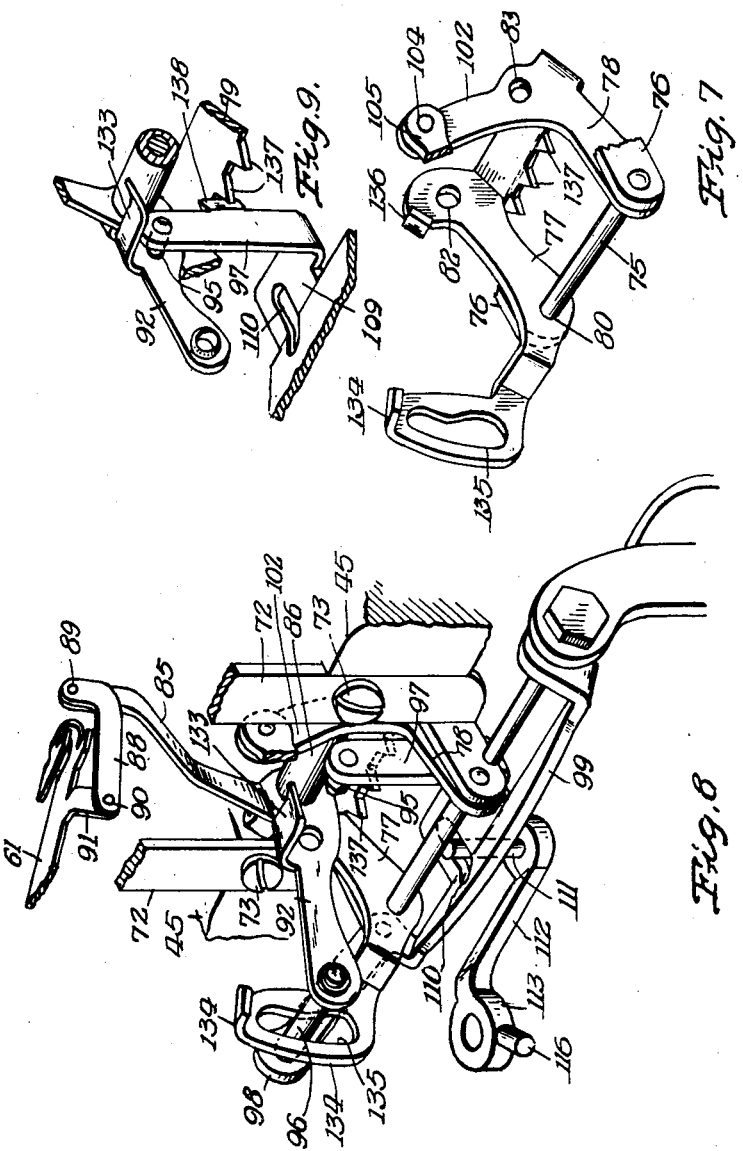
Inventor:
Max Garbell
By Jones, Addington, Ames & Seibold
Attorneys.

Jan. 12, 1932. M. GARBELL 1,841,107
TYPEWRITING MACHINE
Filed Jan. 10, 1928 11 Sheets-Sheet 5
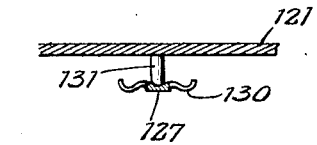
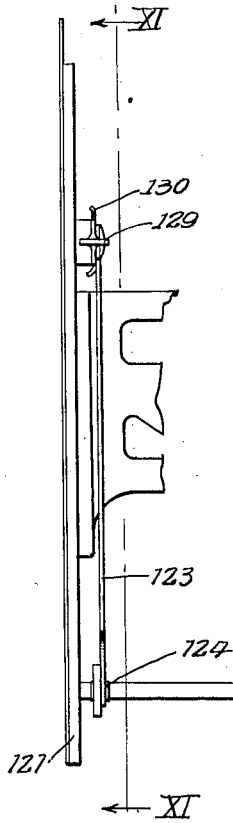
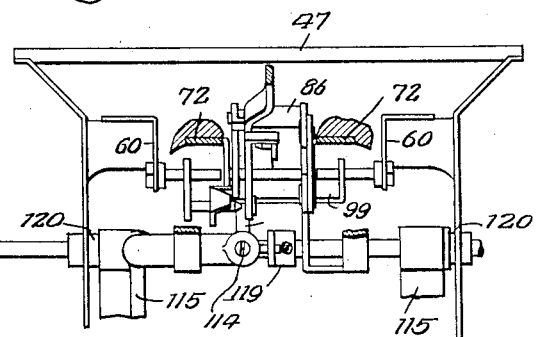
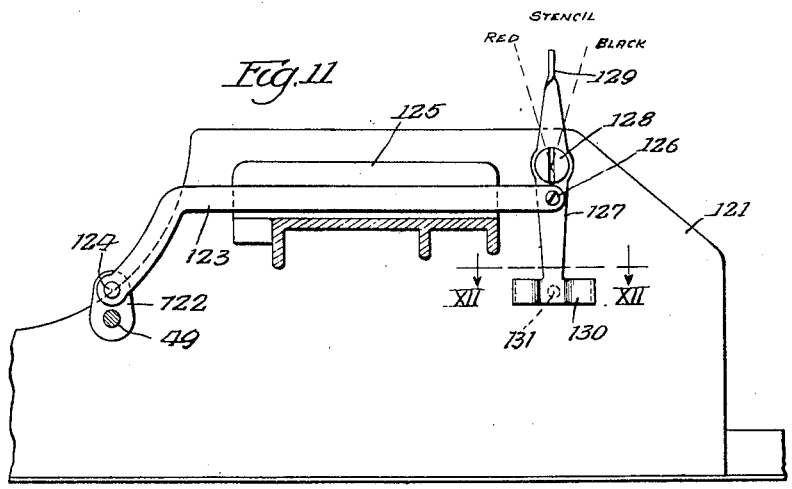
Inventor:
Max Garbell
By Jones, Addington, Ames & Seibold
Attys.

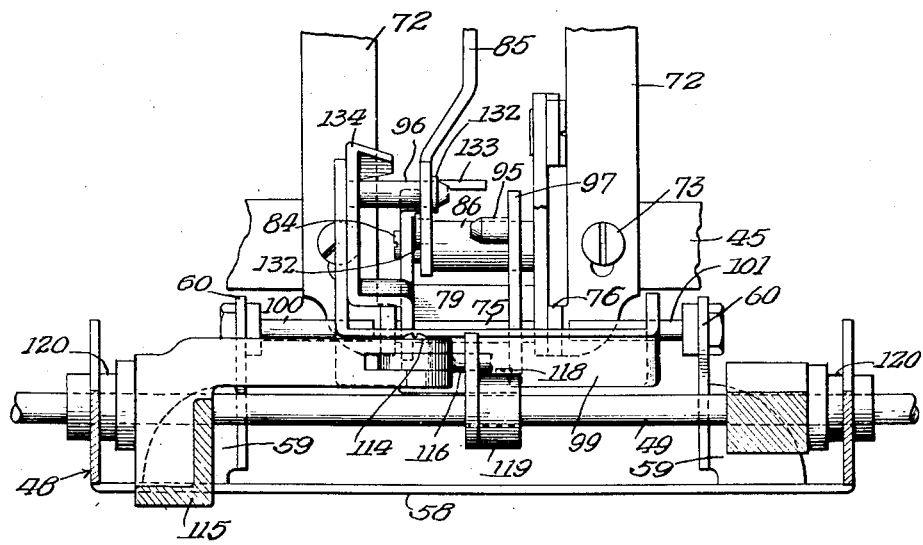
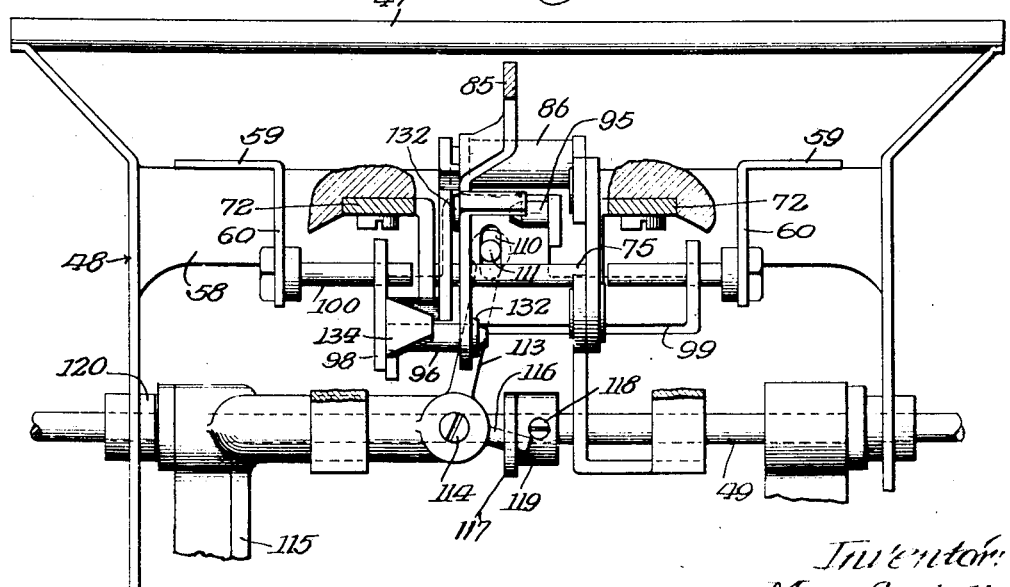

Jan. 12, 1932.  M. GARBELL  1,841,107
TYPEWRITING MACHINE
Filed Jan. 10, 1928  11 Sheets-Sheet 7
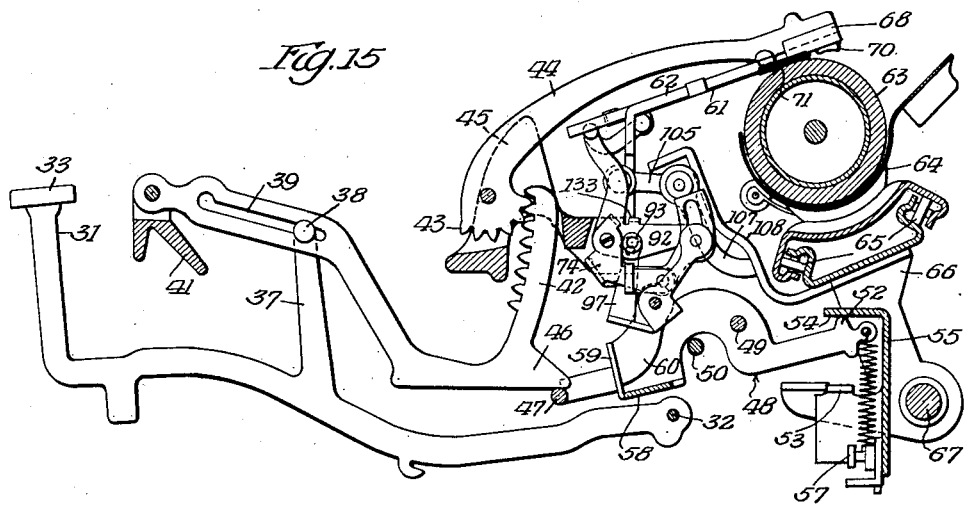
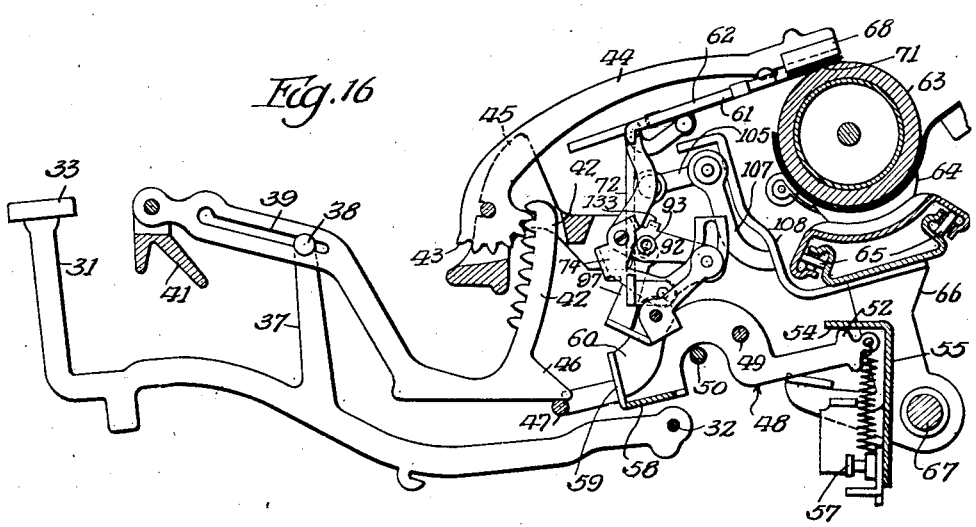
Inventor:
Max Garbell
By Jones, Addington, Ames & Seibold
Attys Jan. 12, 1932.  M. GARBELL  1,841,107
TYPEWRITING MACHINE
Filed Jan. 10, 1928  11 Sheets-Sheet 8
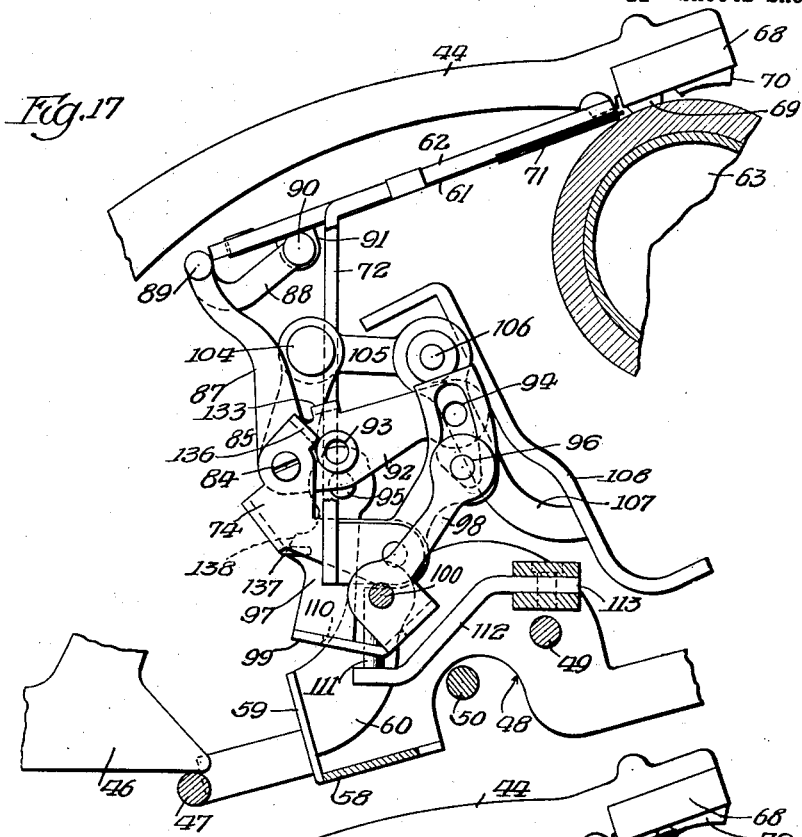
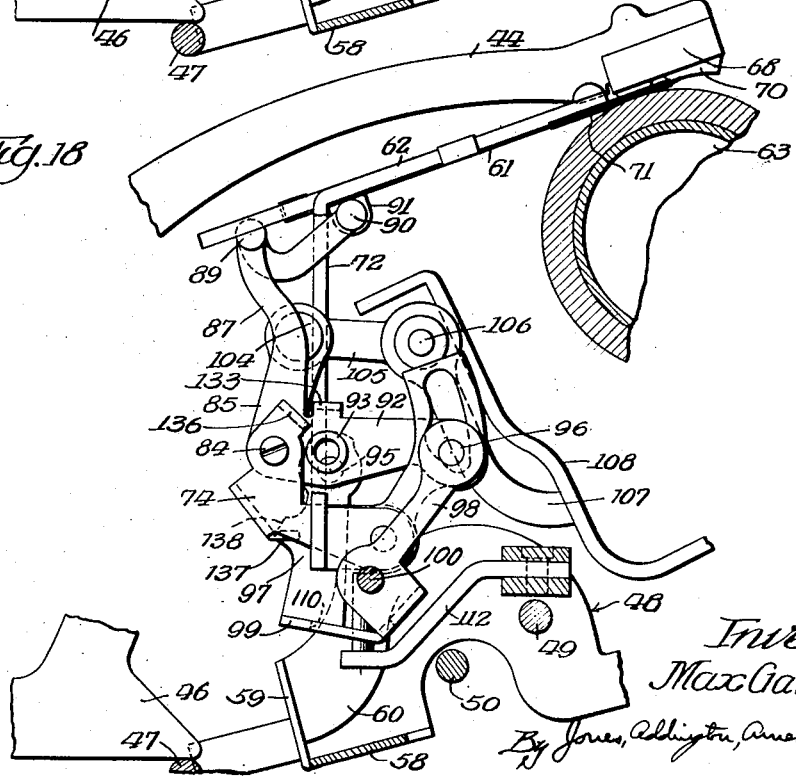
Inventor:
Max Garbell
By Jones, Addington, Ames & Seibold
Attys

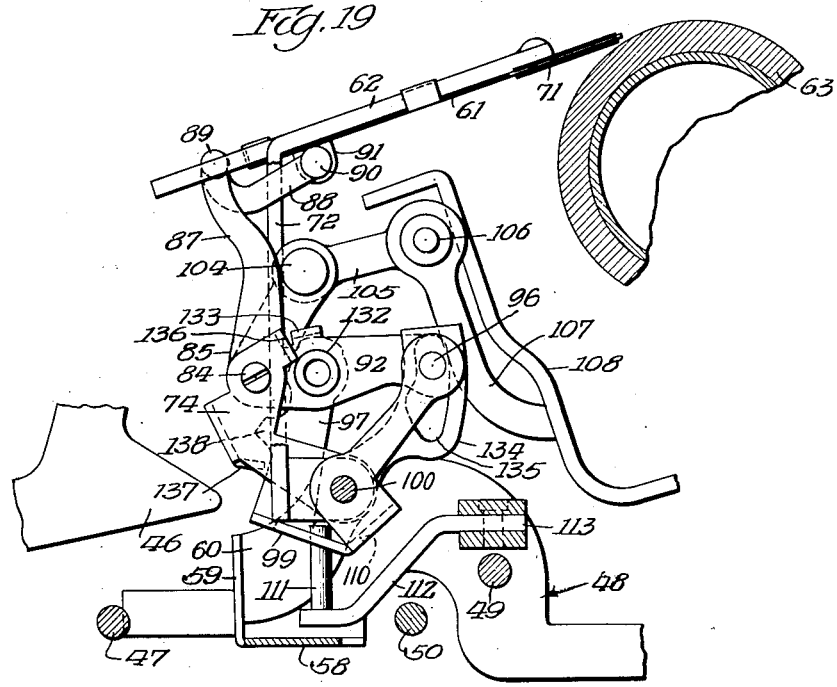
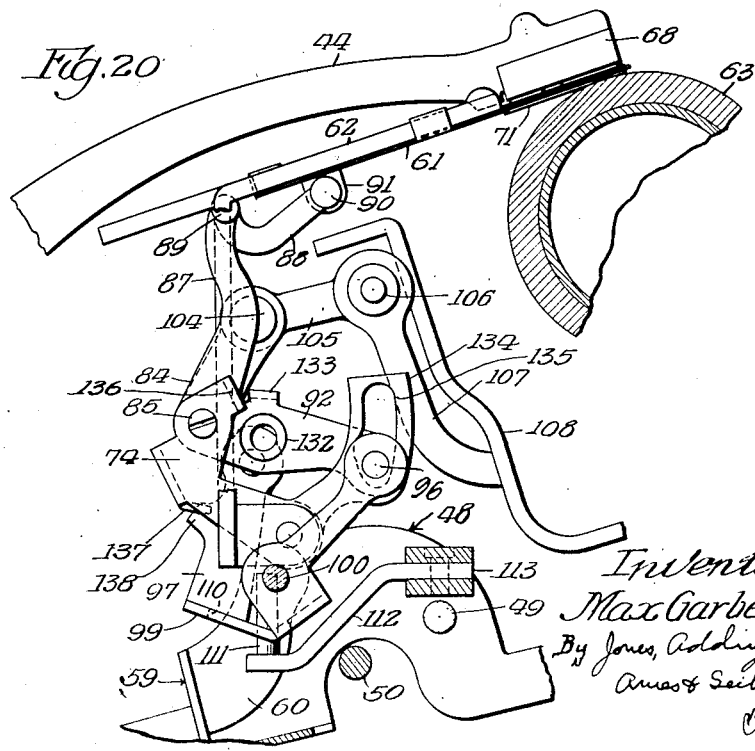

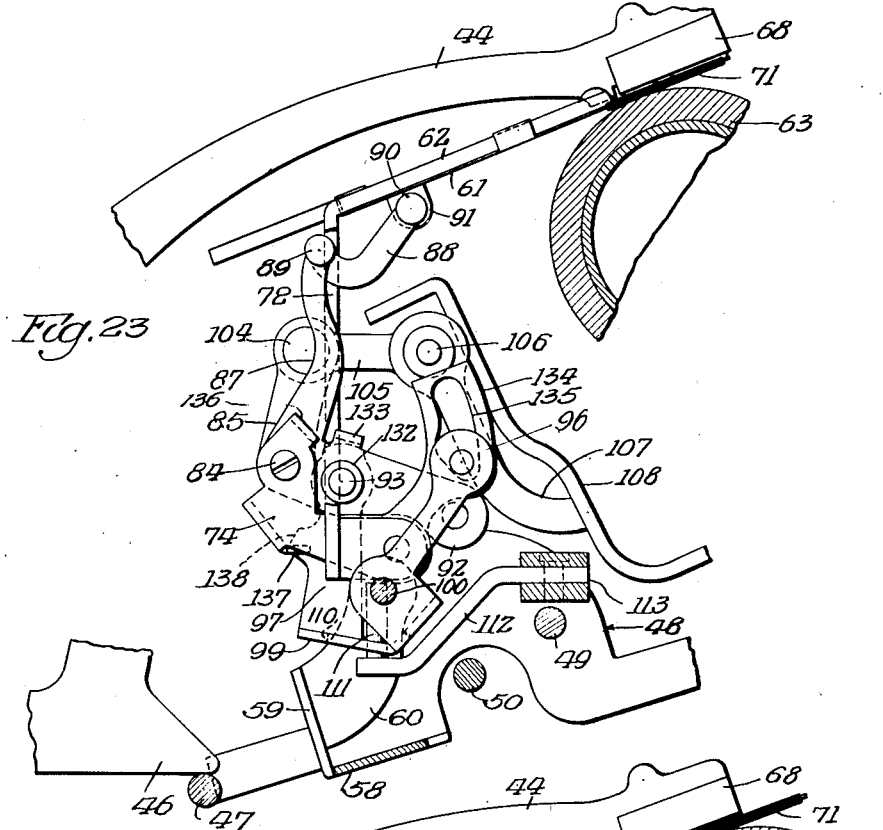
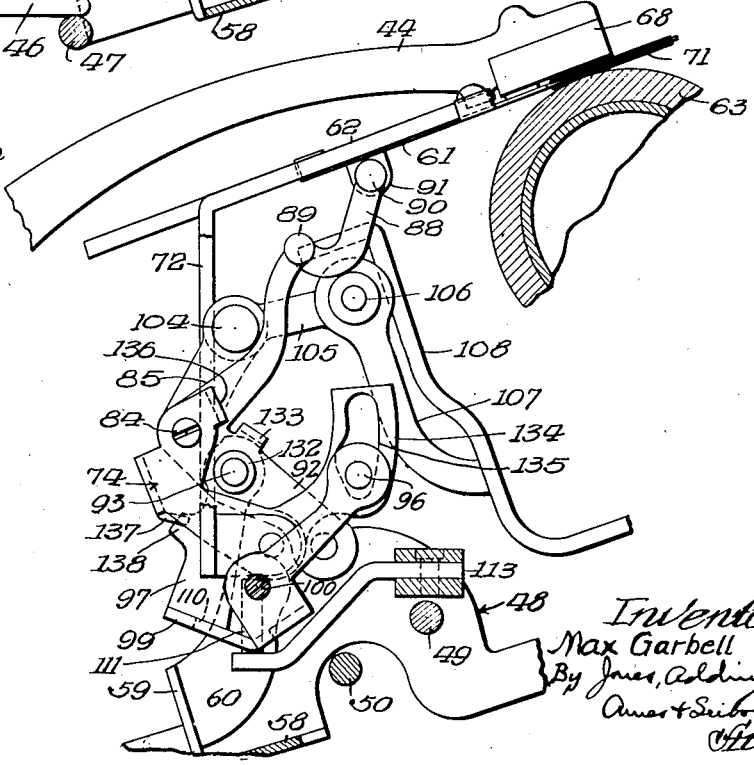

Patented Jan. 12, 1932

1,841,107

UNITED STATES PATENT OFFICE

MAX GARBELL, OF CHICAGO, ILLINOIS, ASSIGNOR TO VICTOR ADDING MACHINE COMPANY, OF CHICAGO, ILLINOIS, A CORPORATION OF ILLINOIS

TYPEWRITING MACHINE

Application filed January 10, 1928. Serial No. 245,791.

My invention relates to typewriting machines and has particular relation to ribbon vibrating mechanism for such machines.

The principle object of my invention is to provide an improved form of ribbon vibrating mechanism that shall be adapted to be utilized in typewriting machines in which case-shift is accomplished by imparting a tilting movement to the platen and carriage about a pivotal axis fixed in relation to the frame of the machine, and that shall comprise means for so adjusting the mechanism as to permit the use of either one of two color fields of a bichrome ribbon, or to permit stencilling, in which case neither color field of the ribbon is utilized.

Many forms of ribbon vibrating mechanisms have been devised embodying means for utilizing either one or neither color field of a bichrome ribbon. Such mechanisms have also been adapted, in some cases, to be utilized in machines wherein case-shift is accomplished by moving the platen and carriage relatively to the type bars. Such movement, however, is in nearly every case a substantially vertical movement rather than a strictly pivotal movement, such as that utilized in the machine with which my invention is adapted to be utilized. It will be understood that when case-shift is accomplished by moving the platen relatively to the type bars and relatively to the frame of the machine, it is necessary to impart a corresponding movement to the ribbon vibrator and its associated mechanism in order to permit the actuation of the ribbon into proper operative position relative to the platen in either of its shifted positions. In machines wherein the type bars and the segment supporting the same are moved with relation to the frame of the machine and the platen to accomplish case-shift, it is apparent that no movement of, or change of operative connections to, the ribbon vibrator is necessitated.

The provision of means for utilizing either one or neither of the color fields of a bichrome ribbon also necessitates the making of some change in the operative connections to the ribbon vibrator in order that it may be vibrated the proper predetermined distance, or, not at all, at each type bar stroke.

My co-pending application, Serial No. 37,085, filed June 15, 1925, discloses and claims a ribbon vibrating mechanism that is adapted to be utilized in typewriting machines having a pivotally mounted platen and carriage to permit case-shift movement thereof and also embodying means for utilizing either of the color fields of a bichrome ribbon. The present invention embodies numerous advantages and improvements over that described in the application referred to. These advantages and improvements will appear, and my present invention will be more clearly understood, by reference to the following detailed description in connection with the accompanying drawings, in which:

Figure 1 is a side elevational view taken along a vertical plane extending longitudinally of a typewriting machine embodying my invention, and showing certain parts of the machine in vertical section. The various parts shown in this figure, in full lines, are in the positions corresponding to the normal or non-printing position of the key-levers and type bars and the lower case or unshifted position of the platen and carriage; some of the principal parts of the mechanism are shown in broken lines in the positions which they assume when a key-lever is depressed for printing, the platen and carriage still remaining in the lower case positon;

Fig. 5 is a fragmentary rear elevational view of the mechanism shown in Fig. 3, showing the parts in the positions assumed thereby when a key-lever is depressed, the color shifting mechanism which is hereinafter described in detail being shown in the position in which it is set to permit stencilling;

Fig. 6 is a detail perspective view showing a shiftable cradle embodied in the mechanism shown in the foregoing figures;

Fig. 7 is another perspective view of the cradle shown in Fig. 6, also showing a fixed shaft upon which this cradle is pivotally mounted and showing portions of the supporting means for said shaft and of a link for actuating the cradle about said shaft;

Figure 1:
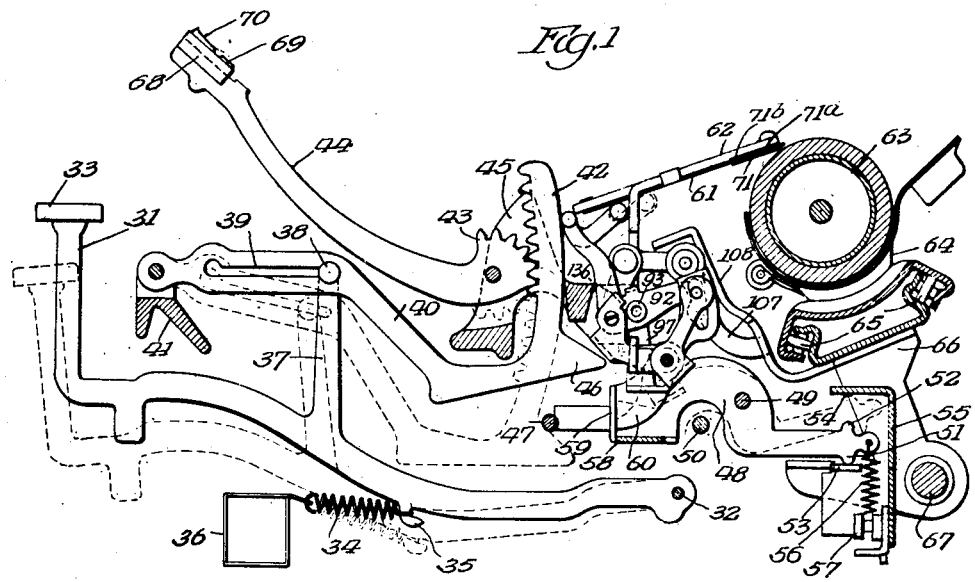
Figure 2:
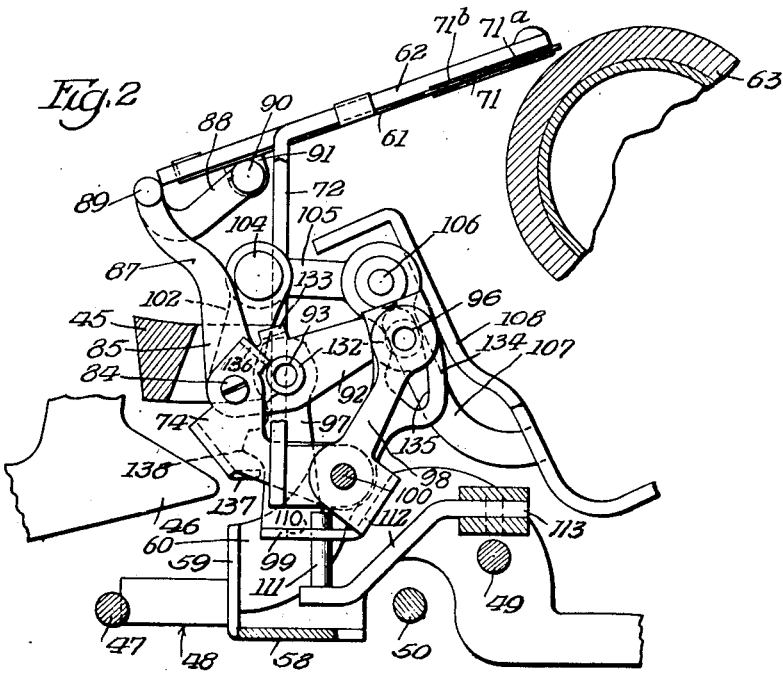
Fig. 2 is a fragmentary enlarged side elevational view taken along the same plane as that of Fig. 1 and showing various parts of the ribbon vibrating mechanism in greater detail, these parts being shown in the positions corresponding to the normal or non-printing positions of the key-levers and type bars and the lower case or unshifted position of the platen and carriage.
Figure 3:
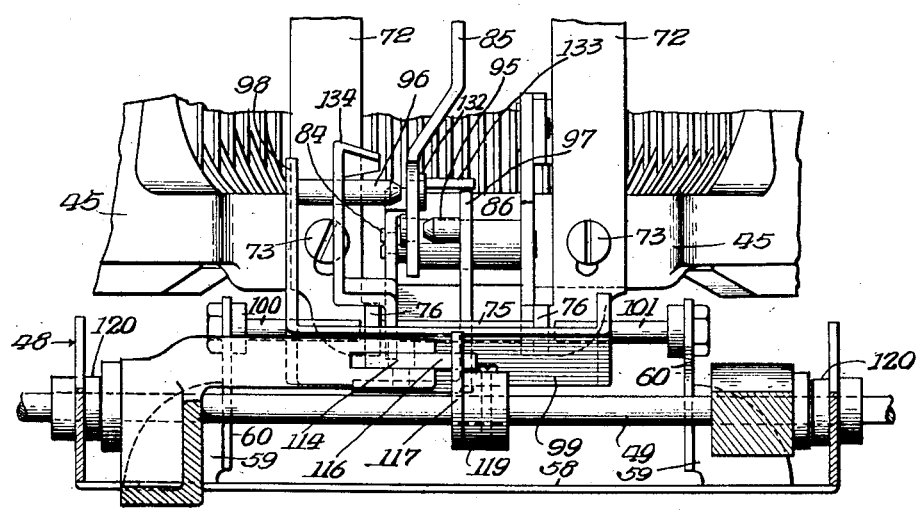
Fig. 3 is a fragmentary rear elevational view of the ribbon vibrating mechanism shown in Figs. 1 and 2, this view also showing certain related parts of the mechanism in vertical section. The parts shown in this figure occupy the positions corresponding to the normal or non-printing positions of the key-levers and type bars.
Figure 21:
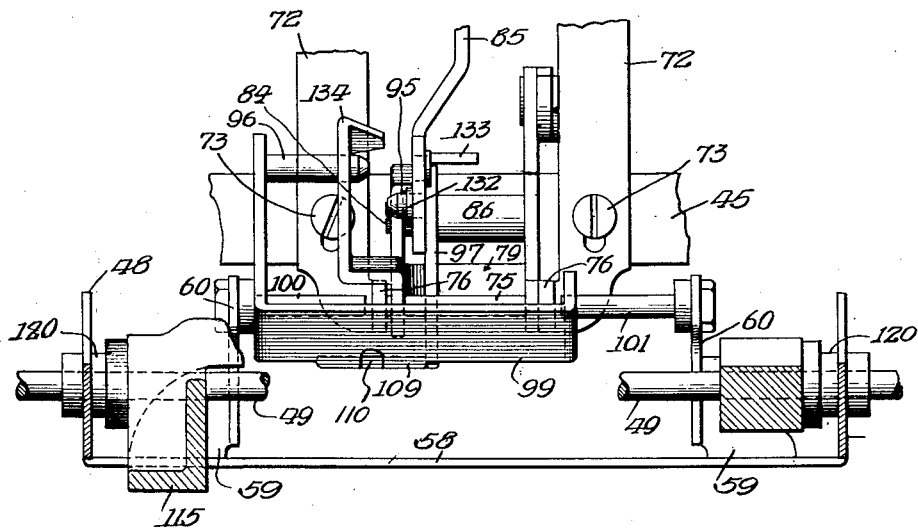
Figure 22:
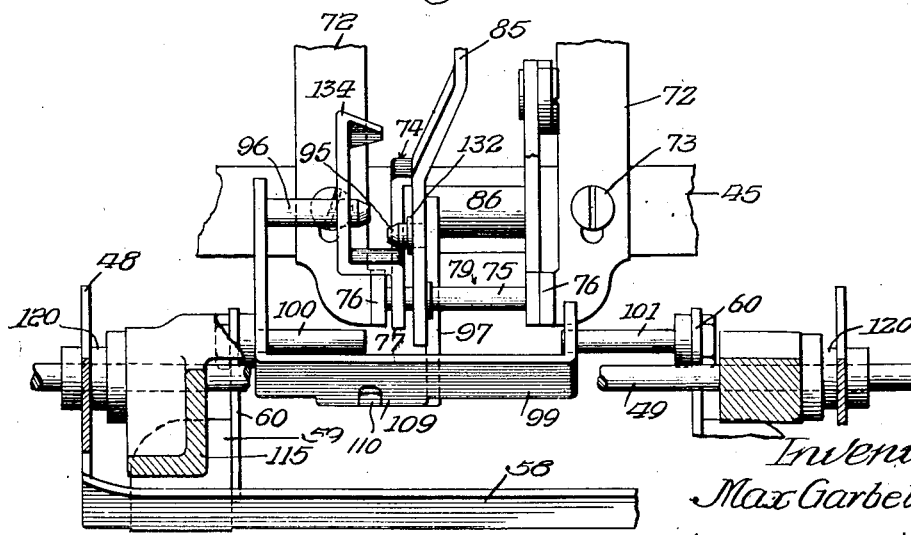

Fig. 8 is a perspective view of the ribbon vibrating mechanism shown in Figs. 1 to 5, inclusive, the color shifting mechanism being here shown in the position which it assumes when set for printing through the upper color field of the bichrome ribbon, which field is hereinafter referred to as the black field. The operative parts of the ribbon vibrating mechanism are shown in this figure in the positions corresponding to the normal or non-printing positions of the key-levers and type bars;

Fig. 9 is a fragmentary perspective view of a portion of the mechanism shown in Fig. 8, but with the color shifting mechanism set to utilize the lower or red field of the ribbon. The operative parts of the mechanism are shown in this figure in the positions which they assume when a key-lever is depressed to actuate the corresponding type bar to its printing position;

Fig. 10 is a fragmentary top plan view showing the mechanism for adjusting the color shifting mechanism from a point near the front portion or keyboard of the machine, some of the parts being here shown in horizontal section. The color shifting mechanism and the adjusting mechanism therefor are shown in positions in which they are set to permit stencilling;

Fig. 11 is a fragmentary vertical sectional view taken along the line XI—XI of Fig. 10;

Fig. 12 is a fragmentary sectional view taken along the horizontal line XII—XII of Fig. 11;

Fig. 13 is a fragmentary rear elevational and vertical sectional view similar to Fig. 3, but showing the color shifting mechanism set to utilize the black color field of the ribbon, the parts being here shown in the positions corresponding to the normal or non-printing positions of the key-levers and type bars;

Fig. 14 is a fragmentary top plan and horizontal sectional view of the mechanism shown in Fig. 13;

Fig. 15 is a general side elevational and vertical sectional view similar to Fig. 1, but showing a key-lever and type bar in their printing positions and showing the ribbon vibrating mechanism actuated to its operative position for printing lower case characters through the upper or black color field of the ribbon;

Fig. 16 is a general side elevational and vertical sectional view similar to Fig. 15, but showing the mechanism in position for printing upper case characters through the upper or black field of the ribbon;

Fig. 17 is a fragmentary enlarged side elevational and vertical sectional view similar to Fig. 2, but showing the parts in lower case printing position with the color shifting mechanism adjusted for stenciling;

Fig. 18 is a view similar to Fig. 17, but showing the parts in lower case black printing position;

Fig. 19 is a view similar to Fig. 17, but showing the parts in upper case non-printing position;

Fig. 20 is a view similar to Fig. 17, but showing the parts in upper case black printing position;

Fig. 21 is a fragmentary rear elevational and vertical sectional view similar to Fig. 13, but showing the color shifting mechanism in position for printing through the red color field of the ribbon, the parts being here shown in positions corresponding to the normal or non-printing positions of the key-levers and type bars;

Fig. 22 is a fragmentary rear elevation and vertical sectional view of the mechanism shown in Fig. 21, but with the parts actuated to the positions which they assume when a key-lever is depressed for printing;

Fig. 23 is a fragmentary enlarged side elevational and vertical sectional view similar to Fig. 17, but showing the mechanism in position for lower case printing through the red color field of the ribbon; and Fig. 24 is a view similar to Fig. 23, but showing the mechanism in position for printing upper case characters through the red color field of the ribbon.

Referring first to Fig. 1 of the drawings, a plurality of key levers 31, only one of which is shown, are pivotally mounted on a fixed rod or wire 32. The key levers 31 comprise the ordinary finger pieces 33 whereby the forward extremities of these levers may be depressed to move the entire levers pivotally about the support 32. A coil spring 34 normally biases each of the key levers toward its uppermost position, each of these springs being connected between an ear or lug 35 provided on the lower edge of the corresponding key lever and a fixed member 36, which may be a cross-member fixed at its opposite ends to the two side walls of the machine frame.

An upstanding arm portion 37 of each key lever 31 is provided at its upper extremity with a pin 38 that is adapted to ride in a longitudinal slot 39 in an intermediate lever 40. These intermediate levers are pivotally supported by a segment 41 that is suitably fixed in the machine frame. The rear extremity of each intermediate lever 40 is provided with an upstanding portion 42 having teeth on its forward edge that are adapted to co-operate with a toothed segment 43 on a type bar 44. The type bars 44 are pivotally supported by a fixed segment 45, which, if desired, may be integral with the intermediate lever segment 41, and may extend between the side walls of the machine frame and be supported thereby.

If it is desired that the movement of the type bars 44 be directly proportional to that of the key levers 41, the pitch line of the teeth on the rack members 42 will be an arc about the pivot provided in the intermediate lever segment 41, and the pitch line of the teeth on the segment portion 43 of the type bar 44 will constitute an arc about the type bar pivot in the segment 45. It will be understood, however, that this pitch line may be varied in form to permit an acceleration of movement of the type bars when the corresponding key levers are depressed, if desired. It will also be understood that each rack portion 42, together with the corresponding segment portion 43, is depressed within a substantially vertical slot provided for that purpose in the type-bar segment 45.

The lower and rear extremity of each intermediate lever 40 comprises a rearwardly extending lug portion 46 having a substantially flat bottom edge adapted to contact with the upper surface of a universal bar 47 which extends transversely of the entire bank of intermediate levers. Since the universal bar 47 is substantially straight, while the intermediate levers 40 are radially disposed in the usual manner, the shape of any one of the lugs 46 will depend upon the relative position of the corresponding intermediate lever in its segment. That is, the lugs 46 on the intermediate levers disposed near the center of the segment 41 will be relatively long, while the lugs on the intermediate levers disposed closer to the side walls of the machine will be relatively short.

The universal bar 47 is fixed to a frame 48 that is pivotally mounted upon a horizontal shaft 49. I have shown the side walls of the frame 48 as comprising substantially arcuate portions to provide clearance for the transverse shaft 50, that is provided for driving the ribbon spools in any suitable manner. The side walls of the universal frame 48 extend rearwardly from the pivoted shaft 49 and comprise, at their rear extremities, stop portions 51 and 52 that are adapted to limit the upward and downward movement, respectively, of the universal bar 47. This movement is limited by contact between the stop portions 51 and 52 with shelf portions 53 and 54, respectively, of a fixed stop member 55.

The stop member 55 may be supported in any suitable manner, either on the frame of the machine or otherwise, but I prefer to mount the same on a bracket member which provides support for the shaft 49, and which is hereinafter referred to in greater detail. The universal bar 47 is biased upwardly by coil springs 56 that are respectively connected between the rear extremity of each rearwardly extending portion of the side walls of the universal frame, and pins 57 that are supported by the corresponding stop members 55.

The universal frame 48 also comprises a cross-member 58 extending between the two side wall portions of said frame, and which may be integral therewith. Two upstanding members 59 are bent off from the front edge of the cross-member 58 into a substantially vertical plane extending transversely of the machine frame, and upwardly and rearwardly extending arms 60 are bent off from each of these upstanding members into substantially vertical planes extending fore and aft of the machine. The arms 60 are connected, by mechanism hereinafter described in detail, to a ribbon carrier 61 that is slidably mounted on a fixed member 62 in such manner that this ribbon carrier is actuated in response to each depression of one of the key levers 31.

It will be understood that a depression of any one of the key levers 31 will cause the corresponding intermediate lever 40 to be actuated downwardly about the pivot provided in the segment 41 to cause the corresponding type bar 44 to be turned about its pivot in the type bar segment 45, this action taking place by reason of the rack and pinion connection between the intermediate levers 40 and the type bars 44. When one of the intermediate levers 40 is actuated downwardly in the manner described, the bottom edge of the lug 46 on said intermediate lever contacts with the upper surface of the universal bar 47 to cause the universal frame 48 to be moved pivotally about the shaft 49. The arms 60 of the universal frame partake of this pivotal movement to actuate the mechanism for vibrating the ribbon carrier 61, as will be described presently.

A platen 63 is rotatably mounted on a suitable supporting frame 64, which, in turn, is supported by anti-friction separators 65 on a shift frame 66. The shift frame 66 is pivotally supported by a shaft 67, through which case-shift movement may be imparted to the platen 63. The details of the mechanism for accomplishing this movement are shown and described in my co-pending application, Serial No. 229,437, filed October 28, 1927, to which reference may be had.

It will be observed that the platen 63 is adapted to occupy either of two positions depending upon which case characters it is desired to print. In this connection, it may be noted that each of the type bars 44 is provided with a type-head 68 comprising a lower case printing character 69 and an upper case printing character 70. When the platen 63 is in its normal or lower case position, the depression of any of the key levers 31 will cause the corresponding lower case character 69 to be actuated into engagement with the platen 63 or with the paper supported thereby upon which the printing is to be done.

When the case shifting mechanism described in my above mentioned co-pending application is actuated, the platen 63 is pivotally moved about the axis of the shaft 67 to such position that it will be engaged by upper case characters 70 in response to the depression of the corresponding key levers, along the same printing line that was engaged by the lower case characters 69 when the platen was in its lower case position.

It will be observed that the movement of the platen 63 between its two case positions is along an arcuate path, and, for this reason, my invention necessarily contemplates the provision of ribbon vibrating mechanism especially adapted to effect proper vibration of the ribbon regardless of the case position of the platen. This mechanism includes the means, above referred to and hereinafter described in detail, for sliding the ribbon carrier 61 along the supporting member 62 therefor to actuate a printing ribbon 71 into position between the printing line on the platen and the approaching printing character at each depression of a key lever. When none of the key levers is depressed, the ribbon and its carrier occupy positions forward of and below the printing line on the platen to render the latter clearly visible to the operator.

My invention also includes means for selectively utilizing either of two color fields of the printing ribbon, and for rendering the vibrating mechanism inoperative to permit stencilling, when desired. The rear or upper portion 71a of the ribbon is hereinafter referred to as the black portion of the ribbon, and the forward or lower portion 71b is hereinafter referred to as the red portion.

Referring now to Figs. 2 to 9 of the drawings, it will be observed that the supporting member 62, upon which the ribbon carrier 61 is slidably mounted, comprises substantially vertical supporting legs 72 that are secured by screws 73 to vertical rabbeted faces at the rear of the type-bar segment 45 in substantially symmetrical position with respect to the center line extending fore and aft of the machine. A cradle 74, which is shown in detail in Fig. 6, is pivotally mounted upon a horizontal shaft 75 that is supported at its opposite extremities by lugs 76 that are bent rearwardly from the supporting legs 72 at the lower extremities thereof.

The cradle 74 comprises two substantially parallel side wall portions 77 and 78 and an integral cross-member 79. The side wall portions 77 and 78 have aligned holes 80 and 81, respectively, therein, and the supporting shaft 75 is adapted to extend through these holes to provide a pivotal mounting for the cradle 74. Aligned holes 82 and 83 are also provided in the side wall portions 77 and 78, respectively, and are adapted to receive a transverse shaft or screw 84 constituting a pivotal support for a ribbon vibrating lever 85.

The lever 85 is substantially in the form of a bell-crank and comprises a sleeve portion 86 through which the supporting shaft or screw 84 passes. An upwardly extending arm 87 of the lever 85 is pivotally connected at its upper extremity to one end of a link 88 by means of a pin 89, the other end of the link 88 being pivotally connected by a pin 90 to a lug 91 that is integral with the ribbon carrier 61 and is bent downwardly therefrom. By means of this construction the ribbon carrier 61 is adapted to be vibrated along the support 62 in response to vibration of the lever 85 about its pivot 84.

The other arm 92 of the lever 85 extends rearwardly and somewhat upwardly from the pivot 84 and is provided with two holes 93 and 94 at different distances from the pivot 84. Pins 95 and 96 are adapted selectively to enter the holes 93 and 94, respectively, to constitute an operative connection of variable leverage between the universal frame 48 and the ribbon vibrating lever 85. The pins 95 and 96 are carried by upstanding arms 97 and 98, respectively, of a pin frame 99 that is both slidably and pivotally mounted on two aligned pins 100 and 101. These pins extend horizontally and transversely of the machine and are supported by the arms 60 that are integral with the universal frame 48.

The pin frame 99, therefore, constitutes a pull-link that is pivotally connected at one end to the universal frame 48 and at the other end to the forwardly extending arm 92 of the ribbon vibrating lever 85. This connection may be adjusted by sliding the pin frame 99 transversely of the machine along the pins 100 and 101 to cause either one of the pins 95 and 96 to enter the corresponding hole 93 or 94 in the forwardly extending arm 92 of the ribbon vibrating lever 85 The mechanism for thus sliding the pin frame 99 on the pins 100 and 101 will be described in detail hereinafter.

Since the hole 93 is much closer to the pivot 84 of the ribbon vibrating lever 85 than is the hole 94, it will be apparent that a depression of the universal frame 48 of a given magnitude will effect either a relatively large or a relatively small vibration of the lever 85 about its pivot, depending upon which of the two pins 95 and 96 is in operative engagement with the forwardly extending arm 92 of the lever 85. Since the amount of depression of a key lever and intermediate lever is constant in the construction which I employ, the amount of depression of the universal frame at each printing stroke is likewise constant. The provision of a variable leverage connection between the universal frame and the ribbon vibrating lever, therefore, permits the ribbon carrier to be vibrated either a relatively large or a relatively small distance. The selective use of a two-color ribbon is provided for in this manner, the mechanism for determining which of the two pins 95 and 96 is to complete the operative connection between the universal frame and the ribbon vibrating lever being so arranged that the pin 96 is in engagement with the hole 94 when the upper or black band of the ribbon is to be utilized, and the pin 95 is in engagement with the hole 93 when the lower or red band of the ribbon is to be utilized.

Referring again to the construction of the cradle 74, which carries the pivotal support for the ribbon vibrating lever 85, it will be observed that the side wall portion 78 comprises an upwardly extending integral arm 102 having a hole 103 therein near its upper extremity. This hole is adapted to receive a pin 104 to constitute a pivotal connection between the cradle 74 and the forward extremity of a pull-link 105. The rear extremity of the pull-link 105 is pivotally connected by a pin 106 to an arm 107 at a point relatively close to the upper extremity thereof. The arm 107 is bent off from the side of an upwardly and forwardly inclined bracket member 108, the lower end of which is bent rearwardly and upwardly and is fixed to the shift frame 66 in any suitable manner, as by being riveted to the under surface of the carriage bed.

By this construction it will be apparent that when the shift frame 66 is moved between case positions about the pivotal mounting of the shaft 67, the cradle 74 is similarly moved about the pivotal mounting of the shaft 75. This movement of the cradle 74 does not disturb the operative relation between the pin frame 99 and the universal frame 48, for the reason that the pins 100 and 101 are axially aligned with the shaft 75 when the universal frame 48 is in its normal or undepressed position. Pivotal movement of the cradle 74 about the shaft 75 in response to a case shifting movement of the platen causes the pin frame 99 to be moved pivotally about the pins 100 and 101 to a like degree, as set forth more fully in the following paragraphs.

When the cradle 74 is moved about its pivot in response to a case shifting movement of the platen, the pivot 84 for the ribbon vibrating lever 85, is, of course, carried along with the cradle. If one of the pins 95 and 96 is in engagement with the corresponding hole in the arm 92 of the lever 85, a similar pivotal movement is imparted to the arm 92 at the point of engagement with such pin. The lever 85 is, therefore, moved bodily about the common axis of the shaft 75 and the pins 100 and 101 to cause the upwardly extending arm 87 of said lever to be moved toward the platen 63. This movement is communicated to the ribbon carrier 61, and thence to the ribbon itself, through the agency of the link 88 which connects the arm 87 to the ribbon carrier 61. The proportions of the various parts of this mechanism are so arranged that the amount of movement thus communicated to the ribbon carrier is exactly equivalent to the movement of the platen 63 between the two case positions thereof. The ribbon carrier 61, therefore, maintains a constant relation to the platen 63 regardless of the case position of the latter.

As will be described more fully hereinafter, the inner ends of the pins 95 and 96 are spaced horizontally to such a degree that the pin frame 99 has a neutral position in which neither of these pins enters the corresponding hole in the arm 92. In this position the ribbon vibrating mechanism is rendered inoperative to permit the use of the machine for stencilling. When the pin frame occupies this neutral position and the platen is shifted to upper case position, the ribbon vibrating lever 85 is moved bodily about the common axis of the shaft 75 and the pins 100 and 101 by reason of engagement between a lug 136 that is bent inwardly from the side wall 77 of the cradle 74 near the upper and forward extremity thereof, and a struck-out flange surrounding the hole 93 in the lever arm 92. The lever 85 is also guided into its proper position by an integral lug or ear 133 that is bent off from the lever arm 92 in such manner as to contact with the upper extremity of the arm 97, said lug or ear also functioning to guide the pin frame 99 in such manner that entry of the pins 95 and 96 into the holes 93 and 94 is facilitated. Under such conditions, therefore, the lever 85 is moved in response to the movement of the platen in the same manner that it is moved when the mechanism is adjusted to vibrate the ribbon, although the arm 92 is entirely freed from connection with the pins 95 and 96. At the same time, the pin frame 99 is moved pivotally about the pins 100 and 101 to maintain the pins 95 and 96 in alignment with the holes 93 and 94 in the lever arm 92, by reason of engagement between the edges of a slot 135 in an arm 134 that is integral with the side wall 77 of the cradle 74, and the pin 96, which extends through said slot. It will be observed that the rear edge of this slot is curved in such manner as to accommodate the free movement of the pin 96 therein when said pin is in engagement with the hole 94 in the lever arm 92, and the front edge is curved to permit free movement of the pin 96 therein when the pin 95 is in engagement with the hole 93 in the lever arm 92. The slot 135 also facilitates shifting of the pin frame 99 between different color printing and stencilling positions by guiding the same to cause the pins 95 and 96 to enter the holes 93 and 94 readily.

It will be apparent therefore, that all of the ribbon vibrating mechanism is actuated to the proper position in response to case shifting movement of the platen, irrespective of whether said mechanism is adjusted for printing through either of the two color fields of the ribbon, or for stencilling. Adjustment of this mechanism to change the same to either color printing position or to stencilling position is thus made possible, regardless of the case position of the platen and regardless of the adjustment of said mechanism when the platen is shifted.

Figure 4:
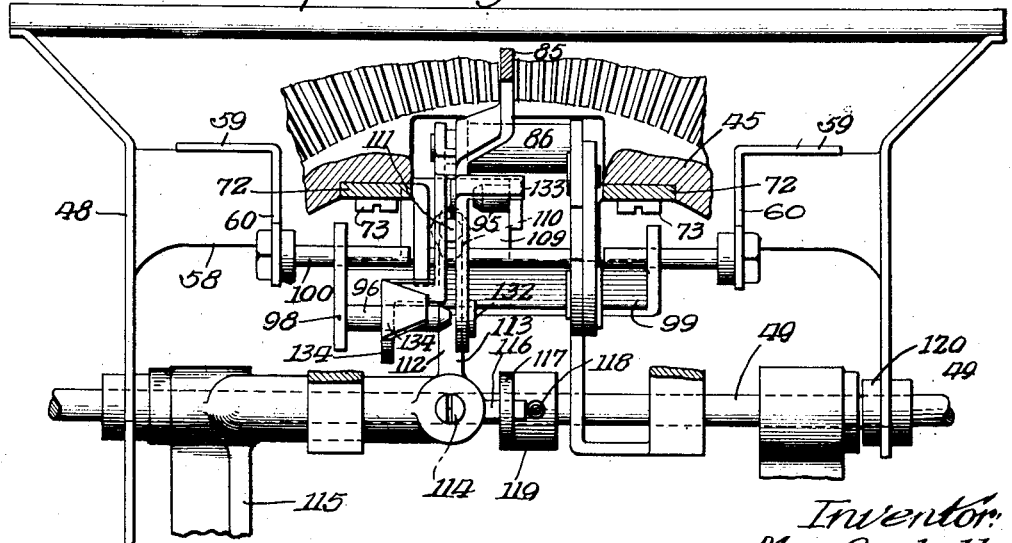
Fig. 4 is a fragmentary top plan view of the mechanism shown in Fig. 3, this view showing certain of the parts in horizontal section.

Referring to Figs. 4 and 5 of the drawings, it will be observed that the pin frame 99 comprises a substantially flat horizontal plate portion 109 at the bottom thereof, and that this plate portion has a slot 110 extending fore and aft of the machine frame. An upstanding pin 111, that is fixed to the forward extremity of one arm 112 of a bell-crank lever 113, lies within the slot 110. The bell-crank lever 113 is supported by a substantially vertical pivot screw 114 in a fixed bracket member 115. The second arm 116 of the bell-crank lever 113 extends in a direction transverse of the machine frame and passes through a slotted aperture in a crank arm 117 that is fixed to the shaft 49 by means of a set screw 118 extending through a collar portion 119 of the crank arm 117.

It will be understood, therefore, that slight rotation of the shaft 49 will cause the bell-crank lever 113 to be moved pivotally about the screw 114, thereby causing the pin 111 to be moved substantially transversely of the machine. This movement of the pin 111 is transmitted to the pin frame 99 to slide the same along the supporting pins 100 and 101, thereby causing one of the pins 95 and 96 to enter the corresponding hole 93 or 94. It will be understood that the position of the universal frame 48 is undisturbed by this slight rotation of the shaft 49, because the pivotal mounting of the universal frame on the shaft is relatively loose. In this connection, it may be observed that each side wall portion of the frame 48 is provided with an integral punched out collar or sleeve member 120 which loosely surrounds the shaft 49 and provides a relatively large bearing surface for the frame 48 on said shaft.

The means for imparting the slight turning movement to the shaft 49 to actuate the pin frame, as above described, are shown in Figs. 10, 11 and 12 of the drawings. Reference to these figures will show that the shaft 49 is supported by the bracket member 115 and also by one side wall 121 of the machine frame, in which the outer extremity of the shaft 49 is journaled. A relatively short crank arm 122 is suitably fixed to the shaft 49 near the said outer extremity and the rear extremity of a link 123 is pivotally connected to this crank arm by a pin 124.

The link 123 extends upwardly and thence forwardly from the crank arm 122 to a point slightly forward of a supporting portion 125 for the intermediate lever and type-bar segments 41 and 45, previously referred to. The forward extremity of the link 123 is pivotally connected by a pin 126 to a manually operable lever 127 at a point slightly below the pivotal mounting of said lever, which mounting is provided by a screw 128 supported by the said wall 121 of the machine frame. The upper extremity of the lever 127 comprises a handle portion 129, and it will be understood that this handle is disposed relatively close to the keyboard of the machine, where it is readily accessible to the operator.

The lower extremity of the lever 127 comprises an integral cross portion 130 bent to form three grooves or depressions on the side of said cross portion adjacent the inner surface of the side wall 121. A pin 131 is secured to the side wall 121 and extends inwardly therefrom to engage the corrugated surface of the cross portion 130. The end of the pin 131 which engages the portion 130 is preferably rounded to permit relatively easy movement of the corrugated surface of the portion 130 thereover when the handle portion 129 is moved, but to prevent movement of the lever 127 under other conditions, as for example, by reason of the vibration of the machine. It will be understood that the lever 127 is sufficiently resilient to accomplish this purpose.

When the handle portion 129 of the lever 127 is moved to the right as viewed in Fig. 11, that is, toward the front of the machine, the shaft 49 is turned a slight amount in a counterclockwise direction. This movement is transmitted to the bell-crank lever 113 to turn the same in a clockwise direction about the pivot screw 114, as viewed from the top in Figs. 4 and 10. The pin frame 99 is, therefore, moved to the right as viewed in these figures to cause the pin 96 to enter the hole 94 in the lever arm 92, this connection beng that adapted to cause vibration of the ribbon to utilize the black stripe thereof.

When the handle portion 129 of the lever 127 is moved to the left, as viewed in Fig. 1, that is, toward the back of the machine, the pin frame 99 is moved in the opposite direction to cause the pin 95 to enter the hole 93 in the lever arm 92, thus establishing the connection by which the ribbon is vibrated to utilize the red stripe thereof.

When the lever 127 is permitted to remain in its neutral position intermediate the so-called red and black positions, the pin frame 99 is likewise maintained in its neutral position in which neither of the pins 95 and 96 is in engagement with the corresponding hole in the lever arm 92. Under these conditions the ribbon vibrating mechanism is rendered inoperative, as previously described, and accordingly, this position of the lever 127 is referred to as the "stencil" position.

It will be observed that the ends of the pins 95 and 96 are slightly tapered to facilitate the entry thereof into the corresponding holes in the lever arm 92, and that the integrally punched out collar portions 132 provide large bearing surfaces between the lever arm and the pins.

In order to prevent shifting of the ribbon vibrating mechanism between its different color and stencilling positions while a key lever is depressed, I provide three fingers 137 extending rearwardly and integrally from the cross member 79 of the cradle 74. A cooperating detent portion 138 is integrally formed on the front edge of the pin supporting arm 97 and is adapted to ride up and down in the spaces between the fingers 137 when the machine is being operated. When none of the key levers is depressed, the detent portion 138 is positioned above the fingers 137 to permit free movement of the pin frame 99 transversely of the machine.

When any one of the key levers is depressed, however, the detent portion 138 enters one of the spaces between the fingers 137, depending upon which of the three operating positions the color adjusting mechanism occupies, and the fingers 137 are then in position to prevent transverse movement of the pin frame. This locked condition is illustrated in Fig. 9 of the drawings. This feature is of considerable value, as the shifting of the color adjusting mechanism during a key lever depression, if permitted, would result in tearing of the ribbon and disfiguration of the work being printed, and might result in injury to the ribbon carrier and its associated mechanism.

Having described the details of construction of the mechanism embodying my invention, I shall now describe the method of operation of the same.

Figs. 1 and 2 show the positions occupied by the ribbon vibrating lever and associated mechanism when none of the key levers is depressed, regardless of the setting of the color shifting mechanism. Fig. 3 shows, in rear elevation, the position of the pin frame 99 and the pins 95 and 96 when the same are adjusted for stencilling operation of the machine, and Fig. 4 shows these elements in the same positions in top plan view. Both of the latter figures show the universal frame and associated mechanism in non-printing position, corresponding to the condition obtaining when none of the key levers is depressed. Fig. 5 shows the universal frame and the pin frame in the positions occupied when the same are depressed in response to the depression of a key lever. Reference to this figure will show that the ribbon vibrating lever 85 is unaffected by the depression of the universal frame and pin frame when the color shifting mechanism is set for stencilling.

Fig. 17 shows the various parts of the mechanism in the positions which they occupy when a key lever is depressed while the color shifting mechanism is adjusted for stencilling. In this figure, it will be observed that the universal frame and the pin frame are shown in side elevation in their depressed positions, while the ribbon vibrating lever and the mechanism that is operable thereby remain in their normal unvibrated positions. This figure shows, in side elevation, the elements in the positions in which they are shown in rear elevation in Fig. 5, the platen being in its lower case or unshifted position.

When the color shifting mechanism is adjusted to cause the pin 96 to enter the hole 94 in the lever arm 92, the machine is operative to print through the upper or black stripe of the ribbon. This adjustment of the color shifting mechanism is shown in Figs. 8, 13, and 14, in all of which figures the universal frame and pin frame are shown in their normal or undepressed positions. Fig. 14 particularly shows the changed position of the bell-crank lever 113 to which position it is actuated in response to the setting of the handle portion 129 of the lever 127 in its foremost position.

As stated above, Figs. 1 and 2 show the elements in side elevation in the positions occupied when none of the key levers is depressed, regardless of the color setting of the mechanism. Figs. 15 and 18 are similar to Figs. 1 and 2, respectively, but show the positions of the elements when the platen is in its lower case position, and the key lever is depressed while the color shifting mechanism is set for printing through the black stripe of the ribbon. In these figures it will be observed that the lever arm 92 has been depressed a relatively slight amount by the pin 96, which is in engagement with the hole 94 in said lever arm. This relatively slight depression of the lever arm 92 causes the ribbon carrier 61 to be actuated a relatively slight distance along the support 62 to bring the upper portion of the ribbon into position between the printing line on the platen and the approaching lower case printing character.

When the platen is shifted to its upper case position while the color printing mechanism remains in its adjustment for printing through the black stripe of the ribbon, the cradle 74 is moved about its supporting pivot 75 by the pull link 105 to cause the ribbon carrier and the ribbon to follow the movement of the platen. Fig. 19 shows the various elements of the device in side elevation in the positions which they occupy when such shift movement has been imparted to the platen before any of the printing keys has been actuated. Comparison of this figure and Fig. 2 will show that the relative positions of the ribbon and the platen are the same in both lower case and upper case positions of the platen.

The depression of a printing key while the platen is in its upper case position and while the color printing mechanism is set for printing through the black stripe of the ribbon, causes the mechanism to be actuated into the positions shown in Figs. 16 and 20. In these figures it will be observed that the upper or black portion of the ribbon is positioned between the printing line on the platen and the approaching upper case printing character.

If the color shifting mechanism is now adjusted to utilize the red strip of the ribbon, the pin 95 will be in engagement with the hole 93 in the lever arm 92, as shown in Figs. 21 and 22. The former of these two figures shows the pin frame 99 and associated elements in the positions which they occupy when none of the printing keys is depressed, and the latter figure shows the same elements in the positions which they occupy when one of the printing keys is depressed.

When a printing key is depressed while the platen is in its lower case position and the color printing mechanism is set for printing through the red stripe of the ribbon, as shown in Figs. 21 and 22, the various parts of the ribbon vibrating mechanism are actuated into the positions shown in Fig. 23. Here, it will be observed that the lever arm 92 has been pulled down through a relatively large angular degree to actuate the ribbon carrier upwardly a relatively great distance as compared with the distance that it is actuated when the mechanism is set for printing through the black stripe of the ribbon. This greater movement is accomplished simply by changing the leverage of the connection to the lever arm 92 and is effective to bring the lower or red stripe of the ribbon into operative position between the printing line on the platen and the approaching lower case printing character.

When the platen is shifted to its upper case position while the color shifting mechanism remains in the adjustment for printing through the red stripe of the ribbon, the cradle 74 is moved pivotally about the shaft 75 in the same manner that it is moved when other color adjustments obtain and the operating leverage of the connection to the ribbon vibrating lever remains the same as when the platen is in its lower case position. The parts are shown in side elevation in Figs. 19 and 24, when such case shift movement has been imparted to the platen, the former of these two figures, as previously stated, showing the parts in the positions which they occupy when none of the printing keys is depressed, and the latter figure showing the parts in the positions which they occupy when one of the printing keys is depressed. In the latter figure it will be observed that the ribbon carrier and the ribbon have been actuated the maximum distance, to bring the lower or red stripe of the ribbon into position between the printing line on the platen and the approaching upper case printing character.

From the foregoing description it will be seen that I have provided a novel and efficient mechanism for accomplishing vibration of a printing ribbon in a typewriting machine, in which case shift is accomplished by moving the platen and its supporting frame pivotally about an axis extending longitudinally of the machine. This ribbon vibrating mechanism comprises adjusting means permitting the use of either one of two color fields of a bichrome ribbon and also permitting the vibrating mechanism to be rendered inoperative when it is desired to use the machine for stencilling. Means are also provided for causing the ribbon carrier to maintain a constant position with respect to the shiftable platen, regardless of the setting of the color shifting mechanism. Furthermore, the mechanism is so constructed that actuation of the color shifting mechanism is precluded during the depression of a printing key.

While I have shown only one specific embodiment of my invention, it will be apparent to those skilled in the art that various changes and modifications may be made in the details of construction without departing from the spirit and scope of my invention, as set forth in the appended claims.

1. In a typewriting machine, in combination, a main frame, a type-bar segment secured thereto, a platen carriage frame pivotally mounted in said main frame, means for imparting case shift movement to said platen carriage frame about said pivotal mounting, a bracket member secured to said segment, a ribbon carrier slidably mounted on said bracket member, a fixed shaft supported by said bracket member, a cradle pivoted on said fixed shaft, a bell-crank pivotally mounted in said cradle, a link connecting one arm of said bell-crank to said ribbon carrier, the other arm of said bell-crank having a plurality of holes therein, a plurality of pins adapted selectively to enter said holes, a frame carrying said pins, a universal frame pivotally mounted in said main frame, a pair of spaced coaxial supporting pins carried by said universal frame, said pin-carrying frame being both pivotally and slidably mounted on said supporting pins, means for sliding said pin-carrying frame on said supporting pins to cause said first-mentioned pins selectively to enter the holes in said other arm of said bell-crank, and means connecting said platen carriage frame and said cradle for imparting pivotal movement to the latter about said fixed shaft and to said pin-carrying frame about said supporting pins when case shift movement is imparted to said platen carriage frame.

2. In a typewriting machine, in combination, a main frame, a type-bar segment secured thereto, a platen carriage frame pivotally mounted in said main frame, means for imparting case shift movement to said platen carriage frame about said pivotal mounting, a bracket member secured to said segment, a ribbon carrier slidably mounted on said bracket member, a fixed shaft supported by said bracket member, a cradle pivoted on said fixed shaft, a bell-crank pivotally mounted in said cradle, a link connecting one arm of said bell-crank to said ribbon carrier, the other arm of said bell-crank having a plurality of holes therein, a plurality of pins adapted selectively to enter said holes, a frame carrying said pins, a universal frame pivotally mounted in said main frame, a pair of spaced coaxial supporting pins carried by said universal frame, said pin-carrying frame being both pivotally and slidably mounted on said supporting pins, means for sliding said pin-carrying frame on said supporting pins to cause said first-mentioned pins selectively to enter the holes in said other arm of said bell-crank, and a link pivotally connected at its respective ends to said platen carriage frame and to said cradle for imparting pivotal movement to the latter about said fixed shaft and to said pin-carrying frame about said supporting frame when case shift movement is imparted to said platen carriage frame.

3. In a typewriting machine, in combination, a main frame, a type-bar segment secured thereto, a platen carriage frame pivotally mounted in said main frame, means for imparting case shift movement to said platen carriage frame about said pivotal mounting, a bracket member secured to said segment, a ribbon carrier slidably mounted on said bracket member, a fixed shaft supported by said bracket member, a cradle pivoted on said fixed shaft, a bell-crank pivotally mounted in said cradle, a link connecting one arm of said bell-crank to said ribbon carrier, the other arm of said bell-crank having a plurality of holes therein, a plurality of pins adapted selectively to enter said holes, a frame carrying said pins, a universal frame pivotally mounted in said main frame, a pair of spaced co-axial supporting pins carried by said universal frame, said supporting pins lying normally in axial alignment with said fixed shaft and said pin-carrying frame being both pivotally and slidably mounted on said supporting pins, means for sliding said pin-carrying frame on said supporting pins to cause said first-mentioned pins selectively to enter the holes in said other arm of said bell-crank, and a link pivotally connected at its respective ends to said platen carriage frame and to said cradle for imparting pivotal movement to the latter about said fixed shaft and to said pin-carrying frame about said supporting pins when case shift movement is imparted to said platen carriage frame.

4. In a typewriting machine, in combination, a main frame, a type-bar segment secured thereto, a platen carriage frame pivotally mounted in said main frame, means for imparting case shift movement to said platen carriage frame about said pivotal mounting, a bracket member secured to said segment, a ribbon carrier slidably mounted on said bracket member, a fixed shaft supported by said bracket member, a cradle pivoted on said fixed shaft, a bell-crank pivotally mounted in said cradle, a link connecting one arm of said bell-crank to said ribbon carrier, the other arm of said bell-crank having a plurality of holes therein, a plurality of pins adapted selectively to enter said holes, a frame carrying said pins, a universal frame pivotally mounted in said main frame, a pair of spaced co-axial supporting pins carried by said universal frame, said supporting pins lying normally in axial alignment with and respectively terminating adjacent either end of said fixed shaft, and said pin-carrying frame being both pivotally and slidably mounted on said supporting pins, means for sliding said pin-carrying frame on said supporting pins to cause said first-mentioned pins selectively to enter the holes in said other arm of said bell-crank, and a link pivotally connected at its respective ends to said platen carriage frame and to said cradle for imparting pivotal movement to said cradle about said fixed shaft and to said pin-carrying frame about said supporting pins when case shift movement is imparted to said platen carriage frame.

5. In a typewriting machine, in combination, a main frame, a vibratable ribbon carrier, a cradle pivotally mounted with respect to said main frame, means for vibrating said ribbon carrier comprising a member pivotally mounted in said cradle, a universal frame, means for actuating said universal frame, and means for connecting said universal frame and said pivotally mounted member comprising an auxiliary frame both pivotally and slidably mounted with respect to said universal frame and carrying pins selectively cooperable with said pivotally mounted member at different distances from the pivotal axis thereof.

6. In a typewriting machine, in combination, a vibratable ribbon carrier, a cradle pivotally mounted about a fixed horizontal axis transverse of the machine, means for vibrating said ribbon carrier comprising a member pivotally mounted in said cradle about an axis parallel to and displaced from said axis, a universal frame, means for actuating said universal frame, and means for connecting said universal frame and said pivotally mounted member comprising an auxiliary frame both pivotally and slidably mounted with respect to said universal frame and carrying pins selectively cooperable with said pivotally mounted member at different distances from the pivotal axis thereof.

7. In a typewriting machine, in combination, a main frame, a vibratable ribbon carrier, a cradle pivotally mounted with respect to said main frame, means for vibrating said ribbon carrier comprising a member pivotally mounted in said cradle, a universal frame, means for actuating said universal frame, means for connecting said universal frame and said pivotally mounted member comprising an auxiliary frame both pivotally and slidably mounted with respect to said universal frame and carrying pins selectively cooperable with said pivotally mounted member at different distances from the pivotal axis thereof, and means for simultaneously turning said cradle and said auxiliary frame about their pivotal mountings to cause the ribbon carrier to assume different positions of repose.

8. A ribbon vibrating mechanism for a typewriting machine having a case-shiftable platen, comprising a pivotally mounted cradle, a vibrator lever pivoted in said cradle, means for moving said cradle about its pivotal mounting when the platen is shifted, and a plurality of pins for selectively engaging said vibrator lever to impart different throws thereto.

9. A ribbon vibrating mechanism for a typewriting machine having a platen mounted for pivotal case shift movement, comprising a pivotally mounted cradle, a vibrator lever pivoted in said cradle, means for moving said cradle about its pivotal mounting when the platen is shifted, and a plurality of pins for selectively engaging said vibrator lever to impart different throws thereto.

10. In a typewriting machine, a vibratable ribbon carrier, an actuating lever therefor, a pivotally mounted member, a pivotal support for said actuating lever carried by said pivotally mounted member, a vibratable universal frame, a connecting member pivotally supported by said universal frame about an axis normally in alignment with the pivotal axis of said pivotally mounted member, a plurality of pins carried by said connecting member, and means for sliding said connecting member longitudinally of its pivotal support to cause said pins selectively to engage said actuating lever.

11. In a typewriting machine, a vibratable ribbon carrier, an actuating lever therefor, a member pivotally mounted about a substantially horizontal fixed axis, a pivotal support for said actuating lever carried by said pivotally mounted member, a vibratable universal frame, a connecting member pivotally supported by said universal frame about an axis normally in alignment with the pivotal axis of said pivotally mounted member, a plurality of pins carried by said connecting member, and means for sliding said connecting member longitudinally of its pivotal support to cause said pins selectively to engage said actuating lever.

12. In a typewriting machine, a vibratable ribbon carrier, an actuating lever therefor, a member pivotally mounted about a substantially horizontal fixed axis extending transversely of the machine, a pivotal support for said actuating lever carried by said pivotally mounted member, a vibratable universal frame, a connecting member pivotally supported by said universal frame about an axis normally in alignment with the pivotal axis of said pivotally mounted member, a plurality of pins carried by said connecting member, and means for sliding said connecting member longitudinally of its pivotal support to cause said pins selectively to engage said actuating lever.

13. In a typewriting machine, a vibratable ribbon carrier, an actuating lever therefor, a member pivotally mounted about a substantially horizontal fixed axis, a pivotal support for said actuating lever carried by said pivotally mounted member, the axis of said support being substantially parallel to and displaced from the axis of said pivotally mounted member, a vibratable universal frame, a connecting member pivotally supported by said universal frame about an axis normally in alignment with the pivotal axis of said pivotally mounted member, a plurality of pins carried by said connecting member, and means for sliding said connecting member longitudinally of its pivotal support to cause said pins selectively to engage said actuating lever.

14. In a typewriting machine, a vibratable ribbon carrier, an actuating lever therefor, a member pivotally mounted about a substantially horizontal fixed axis extending transversely of the machine, a pivotal support for said actuating lever carried by said pivotally mounted member, the axis of said support being substantially parallel to and displaced from the axis of said pivotally mounted member, a vibratable universal frame, a connecting member pivotally supported by said universal frame about an axis normally in alignment with the pivotal axis of said pivotally mounted member, a plurality of pins carried by said connecting member, and means for sliding said connecting member longitudinally of its pivotal support to cause said pins selectively to engage said actuating lever.

15. In a typewriting machine, a vibratable ribbon carrier, an actuating lever therefor, a pivotally mounted member, a pivotal support for said actuating lever carried by said pivotally mounted member, a vibratable universal frame, a connecting member pivotally supported by said universal frame about an axis normally in alignment with the pivotal axis of said pivotally mounted member, a plurality of pins carried by said connecting member, means for sliding said connecting member longitudinally of its pivotal support to cause said pins selectively to engage said actuating lever, and means operable from the key-board of the machine for pivotally moving said pivotally mounted member and said actuating lever bodily about the pivotal axis of the former.

16. In a typewriting machine, a vibratable ribbon carrier, an actuating lever therefor, a pivotally mounted member, a pivotal support for said actuating lever carried by said pivotally mounted member, a vibratable universal frame, a connecting member pivotally supported by said universal frame about an axis normally in alignment with the pivotal axis of said pivotally mounted member, a plurality of pins carried by said connecting member, means for sliding said connecting member longitudinally of its pivotal support to cause said pins selectively to engage said actuating lever, and means operable from the key-board of the machine for pivotally moving said pivotally mounted member, said actuating lever and said connecting member bodily about the pivotal axis of said pivotally mounted member.

17. In a typewriting machine, in combination, a plurality of key levers, a universal frame actuable in response to depressions of said key levers, a ribbon vibrator lever, a connecting member actuable by said universal frame and carrying pins selectively engageable with said vibrator lever, means for moving said connecting member to effect selective engagement between said pins and said vibrator lever, and means for precluding such movement while a key lever is depressed.

18. In a typewriting machine, in combination, a plurality of key levers, a universal frame actuable in response to depressions of said key levers, a ribbon vibrator lever, a supporting member for said vibrator lever, a connecting member actuable by said universal frame and carrying pins selectively engageable with said vibrator lever, means for moving said connecting member to effect selective engagement between said pins and said vibrator lever, and means comprising cooperating detent portions on said vibrator lever supporting member and on said connecting member for precluding such movement while a key lever is depressed.

19. In a typewriting machine, the combination with printing keys and a vibratable ribbon carrier, of means for vibrating said ribbon carrier, means for adjusting said vibrating means to impart different throws to said ribbon carrier, and means for preventing operation of said adjusting means while one of said printing keys is depressed.

20. In a typewriting machine, the combination with printing keys and a vibratable ribbon carrier, of means for vibrating said ribbon carrier comprising a plurality of relatively movable parts, means for adjusting the relative positions of said parts to cause said vibrating mechanism to impart different throws to said carrier, and means for preventing such relative change in the positions of said parts while a printing key is depressed.

21. In a typewriting machine, the combination with printing keys and a vibratable ribbon carrier, of means for vibrating said ribbon carrier comprising a plurality of parts relatively movable in response to the depression of a printing key, means for adjusting the relative positions of said parts in a different manner to cause said vibrating means to impart different throws to said ribbon carrier, and means comprising integral portions of said relatively movable parts cooperating to prevent operation of said adjusting means while said relatively movable parts occupy positions corresponding to the depressed position of one of said printing keys.

22. In a typewriting machine, the combination with printing keys and a vibratable ribbon carrier, of vibrating mechanism comprising a pivotally mounted member connected to said ribbon carrier, a plurality of pins selectively adapted to engage said pivotally mounted member to impart different throws to said ribbon carrier, a supporting frame for said pins movable in response to the depression of said printing keys to impart pivotal movement to said pivotally mounted member, means for moving said pin-supporting frame transversely with respect to said pivotally mounted member to cause said pins selectively to engage said pivotally mounted member, and means for preventing such transverse movement of said pin-supporting frame while one of said printing keys is depressed.

23. In a typewriting machine, the combination with printing keys and a vibratable ribbon carrier, of a pivotally mounted vibrating member connected to said ribbon carrier, a support for said pivotally mounted member, a plurality of pins selectively adapted to engage said vibrating member, a supporting frame for said pins movable in response to the depression of said printing keys to impart pivotal movement to said vibrating member, means for adjusting the position of said pin-supporting frame laterally with respect to said vibrating member to cause said pins selectively to engage said vibrating member, and means cooperating between said support for said pivotally mounted vibrating member and said pin-supporting frame for preventing such lateral adjustment while one of said printing keys is depressed.

24. In a typewriting machine, the combination with printing keys and a vibratable ribbon carrier, of a pivotally mounted vibrating member connected to said ribbon carrier, a support for said pivotally mounted member, a plurality of pins selectively adapted to engage said vibrating member, a supporting frame for said pins movable in response to the depression of said printing keys to impart pivotal movement to said vibrating member, means for adjusting the position of said pin-supporting frame laterally with respect to said vibrating member to cause said pins selectively to engage said vibrating member, and detent portions carried by said support for said pivotally mounted vibrating member and by said pin-supporting frame for preventing such lateral adjusting movement, said detent portions being disposed out of cooperative relation when none of said printing keys is depressed and in cooperative relation when any of said printing keys is depressed.

In witness whereof, I have hereunto subscribed my name.

MAX GARBELL.